(No Model.)
2 Sheets—Sheet 1.
M. CORYELL.
COMBINATION AIR AND CIRCULATING OR WATER PUMP.
No. 306,467. Patented Oct. 14, 1884.
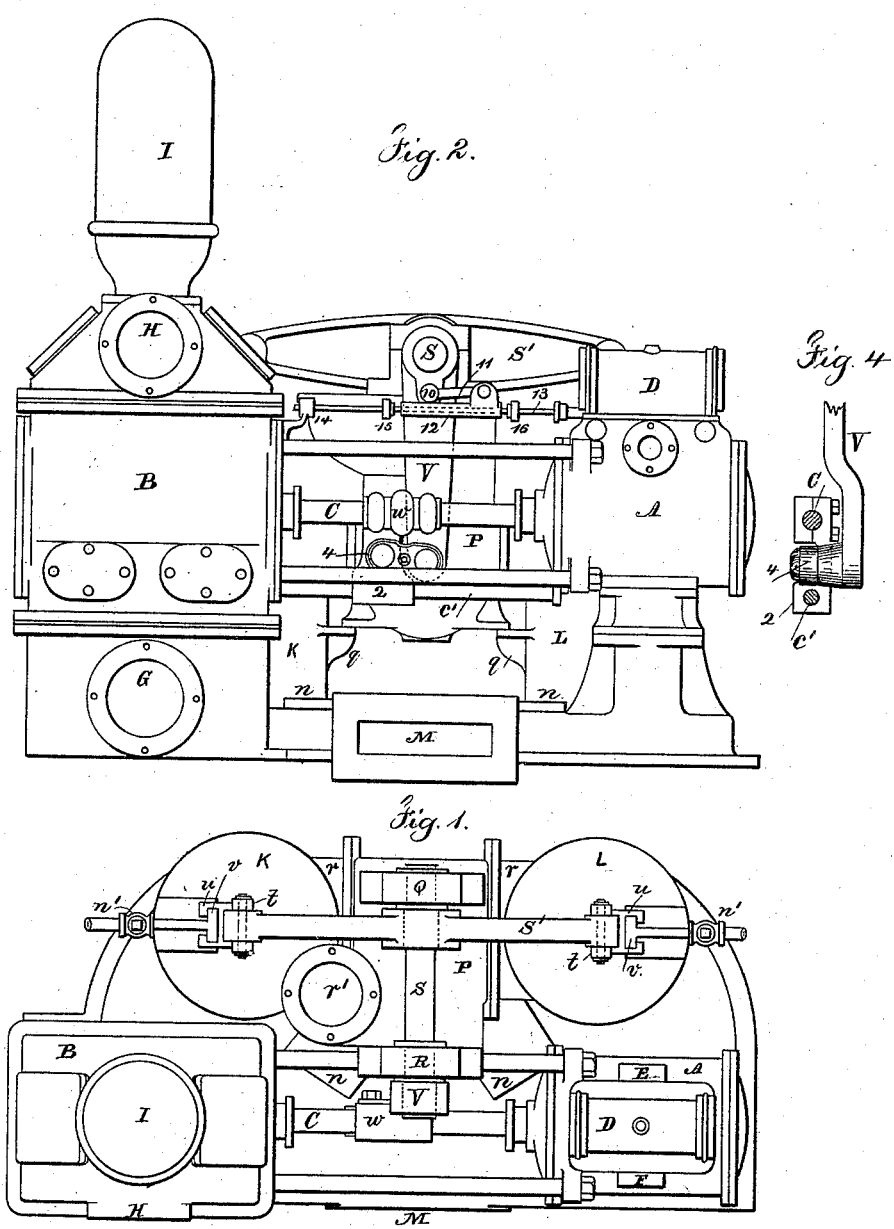

(No Model.)
2 Sheets—Sheet 2.
M. CORYELL.
COMBINATION AIR AND CIRCULATING OR WATER PUMP.
No. 306,467. Patented Oct. 14, 1884.
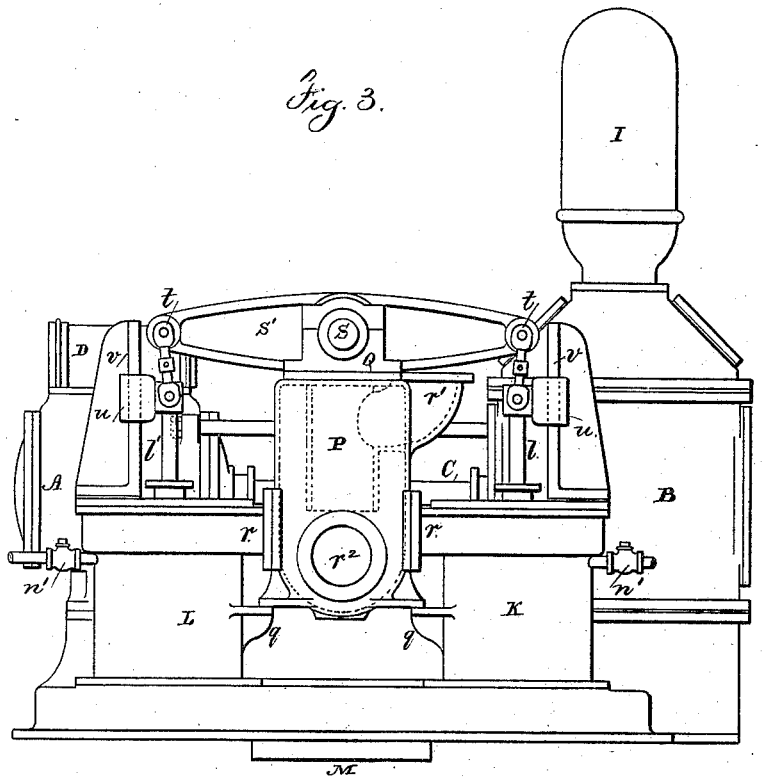
Fig. 3.

UNITED STATES PATENT OFFICE.

MIERS CORYELL, OF NEW YORK, N. Y., ASSIGNOR TO FREDERICK M. WHEELER, OF MONTCLAIR, NEW JERSEY.

COMBINATION AIR AND CIRCULATING OR WATER PUMP.

SPECIFICATION forming part of Letters Patent No. 306,467, dated October 14, 1884.

Application filed February 20, 1884. (No model.)

*To all whom it may concern:*

Be it known that I, MIERS CORYELL, of the city and State of New York, have invented an Improvement in Combined Air and Circulating or Water Pumps, of which the following is a specification.

Before my invention it had been common to employ horizontal pumping-engines the piston of the pump being upon the same rod as the steam-piston. In some cases the piston-rod had extended through the back head of the steam-cylinder, and been connected to a horizontal air-pump. In practice it is found that a horizontal air-pump for marine and other engines is not as efficient, especially when it is double-acting, as a single-acting vertical air-pump, and frequently there is not sufficient space in steam-vessels for the three cylinders to be in line with each other.

In marine engines it has been found to be advantageous to employ a separate engine for the air-pump of the condenser and for the circulating-pump that forces water through the case of the surface-condenser, (when this character of condenser is used,) because the vacuum can be made and maintained in the condenser before the main engine is started, and with engines that are used in sea-going vessels the air-pump connected with the main engine is liable to injury from the rapid motion sometimes resulting from the screw or paddles rising out of the water, in which case an unusual concussion results from the bucket-piston coming into contact with the water in the air-pump.

My improvement is made for combining a horizontal direct-acting pumping-engine with a vertical single-acting air-pump, whereby the water-cylinder of the pumping-engine renders the movements of the steam-engine and air-pump very uniform. The air-pump is of the most reliable character, being vertical and single-acting. The whole mechanism is very compact and strong, and at the same time the parts are of easy access. This combined direct-acting pumping-engine and air-pump is available with marine and other engines for maintaining the vacuum in a surface or jet condenser for simultaneously pumping the water required in feeding the boiler or for circulation through a surface-condenser. It is also available in sugar boiling or refining for maintaining the vacuum required in the different pans and other apparatus, and for pumping the water that is used in cooling, condensing, or other kindred operations; or my improvement may be availed of in any other connection wherever available.

In the drawings, Figure 1 is a plan view of the apparatus. Fig. 2 is an elevation of the pumping-engine, and Fig. 3 is a rear elevation showing the air-pump. Fig. 4 is a detail showing the connection between the crank, box, and link.

The steam-cylinder is represented at A, the water-cylinder at B. C is the piston-rod passing from the piston of the water-cylinder to the piston of the steam-cylinder. The valve-chest D contains any suitable valves. The steam is admitted at E, and the exhaust passes away at F. The water-inlet or suction-pipe is connected at G, the discharge water-way is at H, and the air-vessel at I. The valves of the pump are of any desired character. The air-pumps K L are provided with pistons containing valves, as usual, and $l$ $l'$ are the piston-rods. The main inlet to the air-pumps is at M. It extends in between the water and steam cylinders and branches off to the air-pumps. The foot-valves are beneath the respective plates or covers $n$, which are removable to give access to the valves. The inlet-passages for the water-pump and for the air-pump are cast in the bed of the pump. If desired, pipes and supplemental inlet-valves may be provided, as at $n'$, above the pistons, so that air or light gases or vapors may be drawn into the air-pump on its downward stroke, and so improve the vacuum in those portions of the condenser to which such pipes may be connected.

I remark that each air-pump is constructed internally in any known or approved form and separately does not constitute the present invention. Such air-pumps, however, being vertical and single-acting are usually preferable to any other form of air-pump, owing to their superior efficiency in maintaining a high vacuum. Between the air-pumps is the air-vessel P, supported by flanges $q\ q$ upon the air-pump cylinders, and into this vessel P the discharge-ports $r$ from the air-pumps open, and at $r^2$ is the overflow or discharge to which there is to be a pipe connected for conveying the water of condensation to the desired point of delivery, preferably into a receiver placed at such a level as not to load the discharge-valves with a column of water. This receiver may be used as a filtering-chamber.

Within the air-vessel P is a pendant pipe, open at its lower end to receive the water and convey the same to the lateral external discharge $r'$, which may be used, if desired, in place of the discharge $r^2$. The air that is confined in the vessel P serves as a cushion to prevent injury by the sudden discharge of water from the air-pump.

Upon the air-vessel P there is a bearing or pillar block, Q, and at R there is a second bearing supported upon a flange that extends out from the air-vessel toward the front. These bearings Q R support the rock-shaft S, upon which is the working-beam S', the ends of which are connected to the piston-rods of the air-pump in any convenient manner. I prefer to employ the links $t$ between the upper ends of the piston-rods and the working-beam studs or pins, and to guide the upper end of each piston-rod by a slider or box, $u$, that partially surrounds the vertical guide-bar or slide $v$, that is formed with a foot and bolted to the top of the air-pump, as shown. There is a cross-head, $w$, clamped to the piston-rod C and provided with a box, 2, at its lower end, which slides back and forth upon the stationary guide-rod $c'$ between the cylinders A B, and to this cross-head a link, 4, is attached connecting the cross-head to the crank V, that is affixed to the end of the rock-shaft S. By this construction the steam-engine and cross-head are made to give motion to the crank, rock-shaft, and air-pump pistons, and the stroke is regular and the motion uniform, or nearly so, in consequence of the pump forming a nearly uniform resistance to the motion of the direct-acting steam-engine.

I provide a crank-pin, 10, upon the crank-arm V and a link, 11, to the slider 12 upon the valve-rod 13. One end of this valve-rod 13 is supported upon a bearing, 14, the other end passes through a stuffing-box to the valve, and upon the rod there are tappets or movable collars 15 and 16. The slide 12, coming into contact with first one collar and then the other, gives to the valve the respective motions required near the ends of the stroke of the direct-acting steam-engine.

In cases where more than one pair of air-pumps are required, or where, as in sugar refineries or plantations, sirup or other pumps are made use of, the rock-shaft may be prolonged and provided with crank-arms or working-beams and connecting-rods to such pumps, or the working-beam S' may be longer, or the air-pumps be placed farther apart, so as to receive the connections to other pumps from the one working-beam.

I claim as my invention—

1. The combination, with the horizontal pumping-engine, of vertical single-acting air-pumps, a working-beam connected with the piston-rods of such air-pumps, a rock-shaft for the working-beam, and a crank-arm connected with the cross-head of the direct-acting horizontal pumping-engine, substantially as set forth.

2. The combination, with the direct-acting pumping-engine, of two vertical air-pumps, the air-vessel between the air-pumps, the rock-shaft and pillar-blocks, which are upon the air-vessel, the working-beam, the connections to the piston-rods of the air-pump, and the crank-arm and connection to the cross-head of the engine, substantially as set forth.

3. The combination, with the air-pump and its rock-shaft and working-beam, of a crank-arm upon the rock-shaft, a steam-engine, a water-pump, a piston-rod connecting the pistons of the steam-engine and pump, a cross-head upon the piston-rod, a guide-rod for the cross-head, and a link extending from and connecting the cross-head to the crank-arm, substantially as specified.

4. The combination, with a steam pumping-engine, of a vertical air-pump, the inlet to the air-pump passing in below and between the steam and water cylinders, and mechanism, substantially as specified, for connecting the direct-acting pumping-engine to the vertical air-pumps, substantially as set forth.

5. The combination, with the direct-acting pumping-engine and the steam-valves, of a rock-shaft, a crank-arm, a connection between the cross-head of the engine and the crank-arm, a crank-pin, a link, a sliding tappet, and collars on the valve-rod for giving to the steam-valve a motion from the rock-shaft, substantially as set forth.

6. The combination, with the vertical single-acting air-pumps, of an air-vessel between the air-pumps, the ports between the pumps and air-vessels, the inlet-pipes to the air-pumps, the rock-shaft and its pillar-blocks, the working-beam, and the direct-acting horizontal steam-engine, and a crank-arm connecting the engine to the rock-shaft, substantially as set forth.

7. In combination with the direct-acting pumping-engine having the pistons of the steam-cylinder and the piston of the pump-cylinder attached to the same rod, two single-acting vertical pump cylinders and pistons, and connections to the pumping-engine, and a hollow bed containing passages for the admission of the fluids and vapors to respective pump-cylinders, substantially as set forth.

8. In combination with a direct-acting pumping-engine having the pistons of the steam-cylinder and the piston of the pump-cylinder attached to the same rod, two single-acting vertical pump-cylinders, a chamber or receiver common to both of said single-acting pump-cylinders, and a bed-plate to which the whole mechanism is connected, substantially as set forth.

Signed by me this 5th day of February, A. D. 1884.

MIERS CORYELL.

Witnesses:
GEO. T. PINCKNEY,
WILLIAM G. MOTT.